United States Patent
Kim et al.

(10) Patent No.: US 10,926,730 B2
(45) Date of Patent: Feb. 23, 2021

(54) PASSENGER SIDE AIRBAG HOUSING, MANUFACTURING METHOD THEREFOR, AND PASSENGER SIDE AIRBAG FOR VEHICLE

(71) Applicants: LG Hausys, Ltd., Seoul (KR); Autoliv Development AB, Vårgårda (SE)

(72) Inventors: Dong-Won Kim, Gimpo-si (KR);
Hyun-Jin Choi, Ansan-si (KR);
Yong-Han Kang, Seoul (KR);
Hee-June Kim, Seongnam-si (KR);
Jae-Hoon Choi, Anyang-si (KR);
Sung-Woo Lee, Seongnam-si (KR);
Dong-Young Kim, Hwaseong-si (KR)

(73) Assignees: LG HAUSYS, LTD., Seoul (KR); AUTOLIV DEVELOPMENT AB, Vårgårda (SE)

( * ) Notice: Subject to any disclaimer, the term of this patent is extended or adjusted under 35 U.S.C. 154(b) by 29 days.

(21) Appl. No.: 16/068,215

(22) PCT Filed: Dec. 21, 2016

(86) PCT No.: PCT/KR2016/014961
§ 371 (c)(1),
(2) Date: Jul. 5, 2018

(87) PCT Pub. No.: WO2017/119636
PCT Pub. Date: Jul. 13, 2017

(65) Prior Publication Data
US 2019/0016290 A1    Jan. 17, 2019

(30) Foreign Application Priority Data
Jan. 4, 2016   (KR) .......................... 10-2016-0000352

(51) Int. Cl.
*B60R 21/21*    (2011.01)
*B29C 70/08*    (2006.01)
(Continued)

(52) U.S. Cl.
CPC .............. *B60R 21/21* (2013.01); *B29C 70/08* (2013.01); *B29C 70/202* (2013.01); *B29C 70/28* (2013.01);
(Continued)

(58) Field of Classification Search
CPC ..... B60R 21/21; B60R 21/205; B60R 21/235; B60R 2021/23519; B60R 2021/23509;
(Continued)

(56) References Cited

U.S. PATENT DOCUMENTS 3,920,879 A * 11/1975 Segal ...................... B29C 70/00
428/474.9
4,044,188 A * 8/1977 Segal .................... B29C 70/025
428/297.4
(Continued)

FOREIGN PATENT DOCUMENTS

DE    102009047295 A1    6/2011
DE    102014201099 A1    7/2015
(Continued)

OTHER PUBLICATIONS

International Search Report for PCT/KR2016/014961 dated Feb. 28, 2017, citing the above reference(s).
(Continued)

*Primary Examiner* — Darlene P Condra
(74) *Attorney, Agent, or Firm* — Hauptman Ham, LLP (57) ABSTRACT

Disclosed are a passenger side airbag housing, a manufacturing method therefor, and a passenger side airbag for a vehicle. According to one embodiment of the present invention, a method for manufacturing a passenger side airbag
(Continued)

housing comprises: a material preparation step of preparing a fiber reinforced composite material as a fabric form; and a press molding step of manufacturing a passenger side airbag housing by press-molding the fiber reinforced composite material.

3 Claims, 6 Drawing Sheets

(51) Int. Cl.
*B29C 70/34* (2006.01)
*B60R 21/235* (2006.01)
*B60R 21/205* (2011.01)
*B29C 70/30* (2006.01)
*B29C 70/28* (2006.01)
*B29C 70/20* (2006.01)
*B29C 70/46* (2006.01)
*B29C 70/18* (2006.01)

(52) U.S. Cl.
CPC .............. *B29C 70/30* (2013.01); *B29C 70/34* (2013.01); *B29C 70/46* (2013.01); *B60R 21/205* (2013.01); *B60R 21/235* (2013.01); *B29C 70/18* (2013.01); *B60R 2021/23509* (2013.01); *B60R 2021/23519* (2013.01)

(58) Field of Classification Search
CPC ....... B29C 70/46; B29C 70/202; B29C 70/28; B29C 70/08; B29C 70/30; B29C 70/34; B29C 70/18
See application file for complete search history.

(56) References Cited

U.S. PATENT DOCUMENTS

| | | | | |
|---|---|---|---|---|
| 4,098,943 A * | 7/1978 | Degginger | ............... | B29C 70/00 428/300.7 |
| 4,605,142 A * | 8/1986 | Itoh | .................... | B65D 77/2036 220/260 |
| 5,290,167 A * | 3/1994 | Tanaka | .................... | B29C 51/12 156/494 |
| 5,294,394 A | 3/1994 | Sakai et al. | | |
| 5,607,743 A * | 3/1997 | Disselbeck | .............. | B01J 19/32 428/119 |
| 8,939,745 B2 * | 1/2015 | Fox | ......................... | B29C 43/02 425/112 |
| 2002/0155251 A1 | 10/2002 | Renault | | |
| 2004/0094986 A1 * | 5/2004 | Landvik | ................. | B32B 27/065 296/70 |
| 2006/0097539 A1 * | 5/2006 | Noisternig | .............. | B29C 43/18 296/70 |
| 2007/0296117 A1 * | 12/2007 | Taeye | ...................... | B29C 70/56 264/271.1 |
| 2008/0006625 A1 * | 1/2008 | Borchert | ................. | B29C 66/21 220/4.13 |
| 2008/0168645 A1 | 7/2008 | Grasty | | |
| 2012/0244301 A1 * | 9/2012 | Radtke | .................... | B29C 70/48 428/34.5 |
| 2013/0082416 A1 * | 4/2013 | Wakeman | ............. | B29C 43/183 264/259 |
| 2013/0164470 A1 * | 6/2013 | Oppermann | ............ | B29B 11/16 428/35.6 |
| 2014/0070458 A1 * | 3/2014 | Preisler | ................. | B29C 51/002 264/322 |
| 2014/0077479 A1 | 3/2014 | Kim et al. | | |
| 2015/0197069 A1 | 7/2015 | Basquin et al. | | |
| 2017/0057208 A1 * | 3/2017 | Oosawa | ................... | B32B 27/20 |
| 2017/0059208 A1 * | 3/2017 | Chaudhry | ............ | H05B 1/0244 |
| 2017/0267202 A1 * | 9/2017 | Kong | .................... | B60R 21/215 |
| 2019/0329455 A1 * | 10/2019 | Uchiya | ................... | B29C 39/10 |

FOREIGN PATENT DOCUMENTS

| | | |
|---|---|---|
| DE | 102014106095 A1 | 11/2015 |
| EP | 0281613 A1 | 9/1988 |
| JP | H03-205115 A | 9/1991 |
| JP | 5-330392 A | 12/1993 |
| JP | H06-72272 A | 3/1994 |
| JP | 07032465 A * | 2/1995 |
| JP | 2001-97162 A | 4/2001 |
| JP | 2003-145617 A | 5/2003 |
| JP | 2003-146173 A | 5/2003 |
| KR | 10-2004-0080801 A | 9/2004 |
| KR | 10-2006-0117677 A | 11/2006 |
| KR | 10-2008-0070003 A | 7/2008 |

OTHER PUBLICATIONS

European Extended Search Report dated Dec. 19, 2018 in connection with the counterpart European Patent Application No. EP 16884019.7, citing the above reference(s).

Korean Notice of Allowance dated Sep. 30, 2019, in connection with the Korean Patent Application No. 10-2016-0000352 citing the above reference.

Japanese Office Action dated Oct. 16, 2020, in connection with the Japanese Patent Application No. 2018-534977 citing the above reference(s).

* cited by examiner

PASSENGER SIDE AIRBAG HOUSING, MANUFACTURING METHOD THEREFOR, AND PASSENGER SIDE AIRBAG FOR VEHICLE

CROSS REFERENCE TO RELATED APPLICATION

This present application is a national stage filing under 35 U.S.C § 371 of PCT application number PCT/KR2016/014961 filed on Dec. 21, 2016 which is based upon and claims the benefit of priority to Korean Patent Application No. 10-2016-0000352 filed on Jan. 4, 2016 in the Korean Intellectual Property Office. The disclosures of the above-listed applications are hereby incorporated by reference herein in their entirety.

TECHNICAL FIELD

The embodiments of the invention relate to a housing of a passenger air bag, a manufacturing method thereof, and a passenger air bag for vehicle.

BACKGROUND ART

Recently, interest in safety for passengers as well as functionality and convenience of a vehicle is increased. So, devices related to safety which protect passengers safely from an accident are getting more and more important.

A representative example for these safety devices includes an air bag. The air bag is used along with a safety belt and serves to prevent damages to a body by protecting a portion of the body, such as a head, chest, knee, etc. of a driver or a passenger from colliding with inner structures of the vehicle, when a vehicle collision occurs.

Among various kinds of air bags, a passenger air bag (referred to as 'PAB' hereinafter) is commonly installed on an instrument panel at a passenger seat, and buffers an impact applied on the passenger on the passenger seat when a head-on collision occurs to guarantee safety.

A housing of a passenger air bag (referred to as "PAB" hereinafter) endures an air bag expansion pressure, which is generated to be high by an inflator when the airbag at the passenger seat is expanded, and allows the air bag to be expanded at right timing to protect passengers safely.

Therefore, the housing of a passenger air bag should store the air bag, which is usually folded, inside and bear an inner pressure of the air bag, when the air bag is expanded due to an impact to the vehicle, to allow the air bag to be normally expanded. There should be no structural damage to the housing after expansion.

In order to accomplish this, the housing of a passenger air bag has been conventionally made of a steel material in order to guarantee required strength and hardness. However, this material is prone to corrosion, and increases a weight of a product.

Cited references related to the present invention include Korean Patent Publication No. 2008-0070003 (published on Jul. 29, 2008), which discloses a technique related to a flexible housing for an air bag module.

DETAILED DESCRIPTION OF THE INVENTION

Technical Problem

An objective of the present invention is to provide a housing of a passenger air bag, which guarantees strength the hardness structurally required for the housing of a passenger air bag, prevents corrosion, and decreases a weight when compared to the conventional steel material, a method of manufacturing the housing of a passenger air bag, and a passenger air bag for vehicle.

Another objective of the present invention is to provide a housing of a passenger air bag manufactured by a simplified manufacturing process to improve cost competitiveness of the product, a method of manufacturing the housing of a passenger air bag, and a passenger air bag for vehicle.

The objectives to be solved by the present invention are not limited to the aforementioned objectives, and other objectives can be clearly understood by a skilled artisan based on the description to be followed.

Technical Solution

The method of manufacturing a housing of a passenger air bag according to an embodiment of the present invention comprises a material preparation step of preparing a fiber reinforced composite material in a fiber-like shape, and a press-forming step of press-forming the fiber reinforced composite material to form the housing of a passenger air bag.

In the meantime, in the material preparation step, the fiber reinforced composite material can be one of a continuous fiber reinforced thermoplastic (CFT), a long fiber reinforced thermoplastic (LFT), and a short fiber reinforced thermoplastic (SFT).

Also, in the material preparation step, the fiber reinforced composite material includes at least one reinforcing fiber selected from a group consisting of a glass fiber, an aramid fiber, a natural fiber, a polyester fiber, a polyamide fiber and a combination thereof.

In addition, in the material preparation step, the fiber reinforced composite material includes at least one thermoplastic resin selected from a group consisting of a polypropylene resin, a polyethylene resin, a polyamide resin, a polyester resin, a polyphenylene sulfide resin, and a combination thereof.

A method of manufacturing a housing of a passenger air bag according to another embodiment of the present invention comprises a material preparation step of preparing first and second fiber reinforced composite materials in a fiber-like shape; and a press-forming step of cross-plying and then press-forming the first and second fiber reinforced composite materials to form the housing of a passenger air bag.

In the meantime, during the cross-plying of the first and second fiber reinforced composite materials in the press-forming step, one of the first and second fiber reinforced composite materials can be arranged in a length direction of the housing while the other is arranged in a width direction of the housing.

Also, the first and second fiber reinforced composite materials can be stacked on top of the other to be overlapped at a central region except for both ends of the length direction of the housing.

In addition, in the material preparation step, the first and second fiber reinforced composite materials can be one of a continuous fiber reinforced thermoplastic (CFT), a long fiber reinforced thermoplastic (LFT), and a short fiber reinforced thermoplastic (SFT).

Also, in the material preparation step, each of the first and second fiber reinforced composite materials includes at least one reinforcing fiber selected from a group consisting of a glass fiber, an aramid fiber, a natural fiber, a polyester fiber, a polyamide fiber and a combination thereof.

In addition, in the material preparation step, each of the first and second fiber reinforced composite materials includes at least one thermoplastic resin selected from a group consisting of a polypropylene resin, a polyethylene resin, a polyamide resin, a polyester resin, a polyphenylene sulfide resin, and a combination thereof.

The method of manufacturing a housing of a passenger air bag according to a still another embodiment of the present invention comprises a material preparation step of preparing a single fiber reinforced composite material in a fiber-like shape, and a press-forming step of press-forming the single fiber reinforced composite material using deep drawing to form the housing of a passenger air bag.

In the meantime, the single fiber reinforced composite material can be provided to have a larger area than that of a planar shape of the housing.

Also, in the material preparation step, the single fiber reinforced composite material can be one of a continuous fiber reinforced thermoplastic (CFT), a long fiber reinforced thermoplastic (LFT), and a short fiber reinforced thermoplastic (SFT).

In addition, in the material preparation step, the single fiber reinforced composite material includes at least one reinforcing fiber selected from a group consisting of a glass fiber, an aramid fiber, a natural fiber, a polyester fiber, a polyamide fiber and a combination thereof. Also, in the material preparation step, the single fiber reinforced composite material includes at least one thermoplastic resin selected from a group consisting of a polypropylene resin, a polyethylene resin, a polyamide resin, a polyester resin, a polyphenylene sulfide resin, and a combination thereof.

The housing of a passenger air bag according to an embodiment of the present invention can be manufactured by the aforementioned method of manufacturing a housing of a passenger air bag.

The passenger air bag for vehicle according to embodiments of the present invention includes the housing of a passenger air bag mentioned above.

Advantageous Effects

According to the present invention, it is possible to guarantee structural strength and hardness required for a housing of a passenger air bag of a vehicle.

Also, when compared to the conventional steel material, the housing is not corroded even after a long time use, which results in improvements in satisfaction during use and endurance of the product.

In addition, when compared to the conventional steel material, it is possible to manufacture the housing of a passenger air bag of a vehicle by press-forming at least one fiber reinforced composite material. Therefore, weight of components of the vehicle is reduced.

Furthermore, the manufacturing process for a housing of a passenger air bag is simplified when compared to the conventional case, which results in improvements in productivity and cost competitiveness.

Detailed effects along with the aforementioned effects of the present invention will be described while explaining the embodiments of the present invention enough such that the embodiments can be practiced.

BEST MODE

The advantages and features of the present invention, and a method for accomplishing these will be apparent when referring to the embodiments which are to be described later in detail in connection with the appended drawings. It is to be noted that the present invention is not restricted to the embodiments disclosed in the following and can be realized in various different configurations, and the embodiments are provided to fully disclose the present invention and help a person with an ordinary skill in the art completely understand the categories of the present invention. Same reference symbols refer to the same components throughout the specification.

Also, in the explanation on the present invention in the following, detailed explanations on a related known function or a configuration will be omitted when it is determined that they will unnecessarily obscure the subject matter of the present invention. The following terms are defined in consideration of the functions of the embodiments of the present invention and they can be interpreted differently based on the convention or intention of a user or an operator, etc. Therefore, the definition of the terms should be made based on the content of the whole specification.

Mode of the Invention

In the following, a housing of a passenger air bag, a manufacturing method thereof, and a passenger air bag for vehicle according to embodiments of the invention will be explained in detail by referring to the appended figures.

Figure 1:
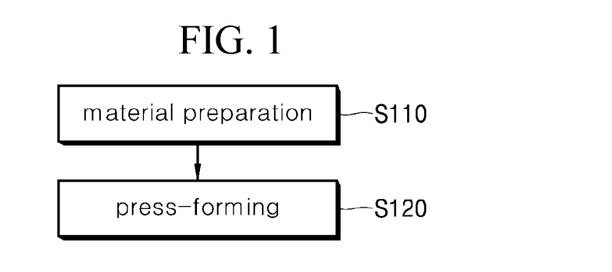
FIGS. 1-3 are flow charts which simply illustrate methods of manufacturing a housing of a passenger air bag according to embodiments of the invention.

FIG. 1 is a flow chart which simply illustrates methods of manufacturing a housing of a passenger air bag according to embodiments of the invention.

When referring to FIG. 1, the method of manufacturing a housing of a passenger air bag of a passenger air bag as illustrate includes a material preparation step S110, and a press-forming step S120.

The material preparation step S110 corresponds to a step of preparing a fiber reinforced composite material in a fabric-like shape.

More particularly, the fiber reinforced composite material which is prepared in a fabric-like shape in the material preparation step can be a continuous fiber reinforced thermoplastic (CFT), a long fiber reinforced thermoplastic (LFT), or a short fiber reinforced thermoplastic (SFT).

In addition, the fiber reinforced composite material which is prepared in the fabric-like shape in the material preparation step S110 can include a reinforcing fiber and a thermoplastic resin. Here, although at least one selected from a group consisting of a glass fiber, an aramid fiber, a natural fiber, a polyester fiber, a polyamide fiber and a combination thereof can be preferably used as the reinforcing fiber included in the fiber reinforced composite material, the reinforcing fiber is not restricted to these.

Here, a length of the reinforcing fiber can be variably changed according to the objectives and functions of the present invention and is not particularly specified. That is, the structural strength and hardness required for the housing of a passenger air bag can be guaranteed by setting the length within a proper range.

And, although the at least one selected from a group consisting of a polypropylene resin, a polyethylene resin, a polyamide resin, a polyester resin, a polyphenylene sulfide resin, and a combination thereof can be preferably used as the thermoplastic resin included in the fiber reinforced composite material, the thermoplastic resin is not restricted to these.

The passenger air bag (PAB) is typically installed on the instrument panel at the passenger seat and corresponds to a device which buffers the impact applied to a passenger at the passenger seat in case of a head-on collision to guarantee safety.

The housing of a passenger air bag endures an air bag expansion pressure, which is generated to be high by an inflator when the airbag at the passenger seat is expanded, and allows the air bag to be expanded at right timing.

The housing of a passenger air bag is configured to store the folded air bag during normal use and endure the inner pressure of the air bag when the air bag is expanded due to an impact. Therefore, required strength and hardness should be obtained for the housing.

According to the prior art, the housing has been made of a steel material. However, this material is prone to corrosion, heavy, and even hard to form, which results in degradation of the degree of design freedom. In order to solve these problems, according to the present invention, a fiber reinforced composite material, which includes proper amounts of a reinforcing fiber and a thermoplastic resin, is prepared in a fabric-like shape, and the housing of an air bag can be manufactured by a simple air bag.

The press-forming step S120 corresponds to a process which press-forms the aforementioned fiber reinforced composite material to manufacture the housing of an air bag.

Figure 10:
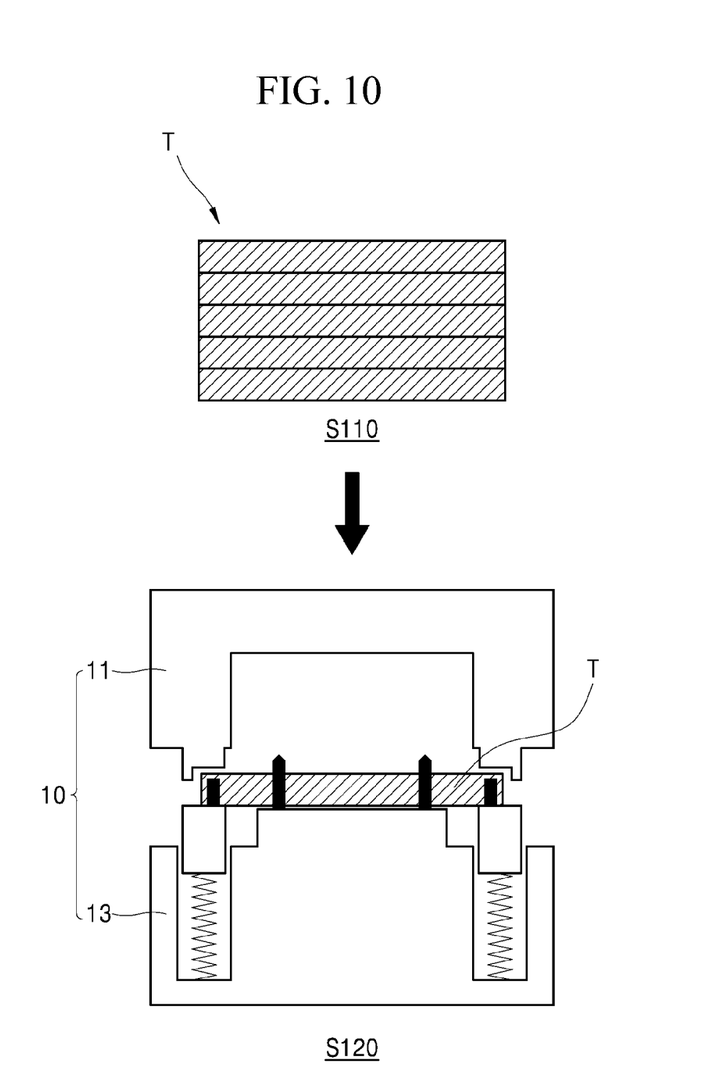
FIG. 10 is a process chart which simply illustrates the methods of manufacturing a housing of a passenger air bag according to embodiments of the invention.

For example, as shown in the process chart in FIG. 10, the fiber reinforced composite material T which is prepared in a fabric-like shape is heated to a predetermined temperature and the heated fiber reinforced composite material is placed between upper and lower molds 11, 13 of a press mold 10. Then, the upper and lower molds 11, 13 are pressed against each other to form a housing of a target shape from the fiber reinforced composite material T in the fabric-like shape.

According to the present invention, the housing can be easily formed from the fiber reinforced composite material in a fabric-like shape by using a press device. This manufacturing process is simplified compared to the conventional method which includes press-forming/pre-forming and injection processes. In addition, the manufacturing cost is lowered. Also, it is possible to improve degree of design freedom of the formed product without adding a separate injection process.

Figure 2:
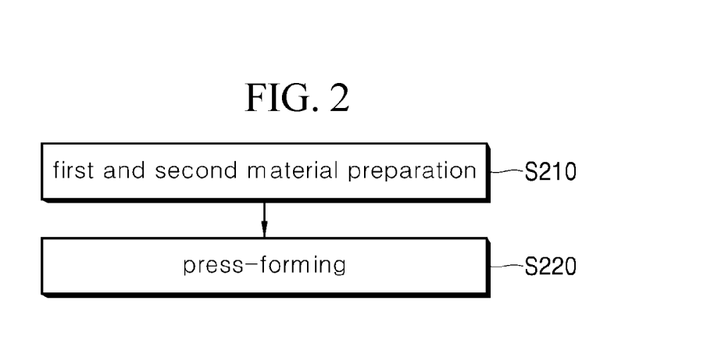

FIG. 2 is a flow chart which simply illustrates methods of manufacturing a housing of a passenger air bag according to the first embodiment of the invention.

When referring to FIG. 2, the method of manufacturing a housing of a passenger air bag of a passenger air bag according to the first embodiment of the present invention includes a material preparation step S210, and a press-forming step S220.

According to the first embodiment of the present invention, in the material preparation step S210, two fabric-like fiber reinforced composite materials (referred to as first and second fiber reinforced composite materials T1, T2, hereinafter; refer to FIG. 5) are prepared.

One of a continuous fiber reinforced thermoplastic (CFT), a long fiber reinforced thermoplastic (LFT), and short fiber reinforced thermoplastic (SFT) is preferably used as the first and second fiber reinforced composite materials T1, T2 (refer to FIG. 5); however the fiber reinforced composite material is not restricted to these.

And, the first and second fiber reinforced composite materials T1, T2 (refer to FIG. 5) can include a reinforcing fiber and a thermoplastic resin.

Here, although at least one selected from a group consisting of a glass fiber, an aramid fiber, a natural fiber, a polyester fiber, a polyamide fiber and a combination thereof can be used as the reinforcing fiber, the reinforcing fiber is not restricted to these.

And, although the at least one selected from a group consisting of a polypropylene resin, a polyethylene resin, a polyamide resin, a polyester resin, a polyphenylene sulfide resin, and a combination thereof can be preferably used as the thermoplastic resin, the thermoplastic resin is not restricted to these.

Figure 4:
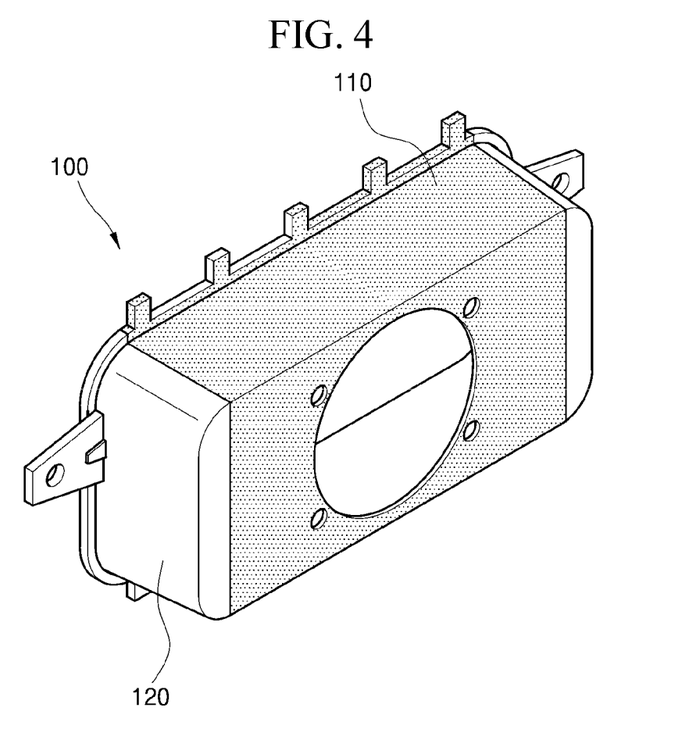
FIG. 4 is a perspective view which schematically shows the housing of a passenger air bag according to a first embodiment of the present invention.

In the press-forming step S220, the first and second fiber reinforced composite materials T1, T2, (refer to FIG. 5) are press-formed to form the housing 100 of an air bag (refer to FIG. 4). In the meantime, the first and second fiber reinforced composite materials can be cross-plied before the material is formed into the housing by using the press mold 10 shown in FIG. 8. When referring to FIG. 5, the first and second fiber reinforced composite materials T1, T2 can be cross-plied as shown in the figure.

As a specific example, the first fiber reinforced composite material T1 can be arranged along a width direction (up/down direction in FIG. 5) of the housing 100, which is a result of the press-forming. Differently, the second fiber reinforced composite material T2 can be arranged along a length direction (left/right direction in FIG. 5) of the housing 100, which is a result of the press-forming. It can be called as a cross-ply.

In this case, the first and second fiber reinforced composite materials T1, T2 can be stacked on top of the other to be overlapped at a central region except for both ends of the length direction of the housing, and the overlap ratio can be adjusted slightly according to the selection of an operator.

Figure 8:
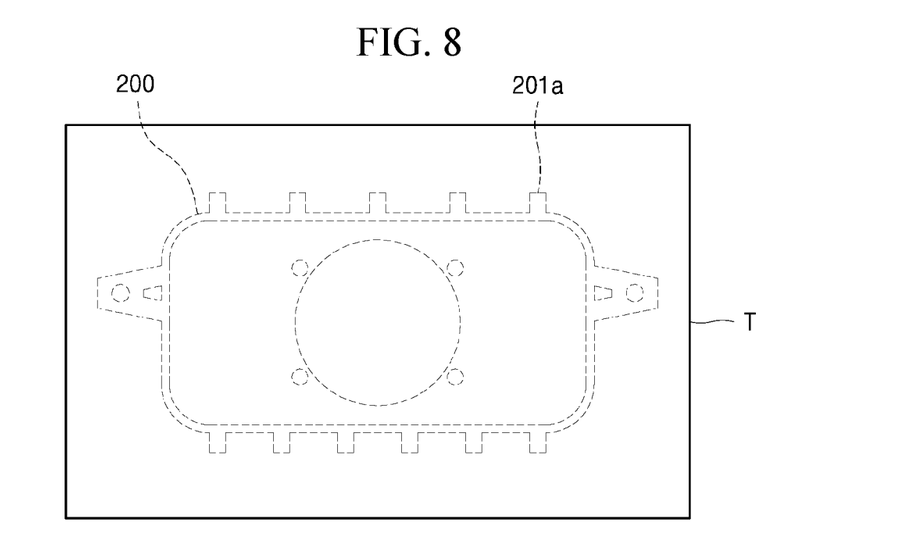
FIG. 8 shows a single fiber reinforced composite material which is expanded to be prepared in order to manufacture the housing of a passenger air bag according to the second embodiment of the present invention and shows a hook type configuration.

Similarly, after the first and second fiber reinforced composite materials T1, T2 are cross-plied, the material is placed between the upper and lower molds 11, 13 of the press mold 10 shown in FIG. 8, and then the desired housing shape can be easily formed by press-forming. As a result, the housing 100 of a passenger air bag as shown in FIG. 4 can be manufactured. The housing of a passenger air bag 100 can have a reinforced structure and includes a second fiber reinforced composite material forming portion 120, which is made of the second fiber reinforced composite material T2 (refer to FIG. 5) only, and a first fiber reinforced composite material forming portion 110, which is formed by overlapping the second fiber reinforced composite material T2 (refer to FIG. 5) with the first fiber reinforced composite material T1. Similarly, according to the present invention, the target housing of an air bag can be easily formed by preparing two fabric-like fiber reinforced composite materials and then cross-plying them. The housing of a passenger air bag according to the first embodiment of the present invention which has be manufactured as above can be lighter than conventional steel products and can be resistant to corrosion.

Figure 5:
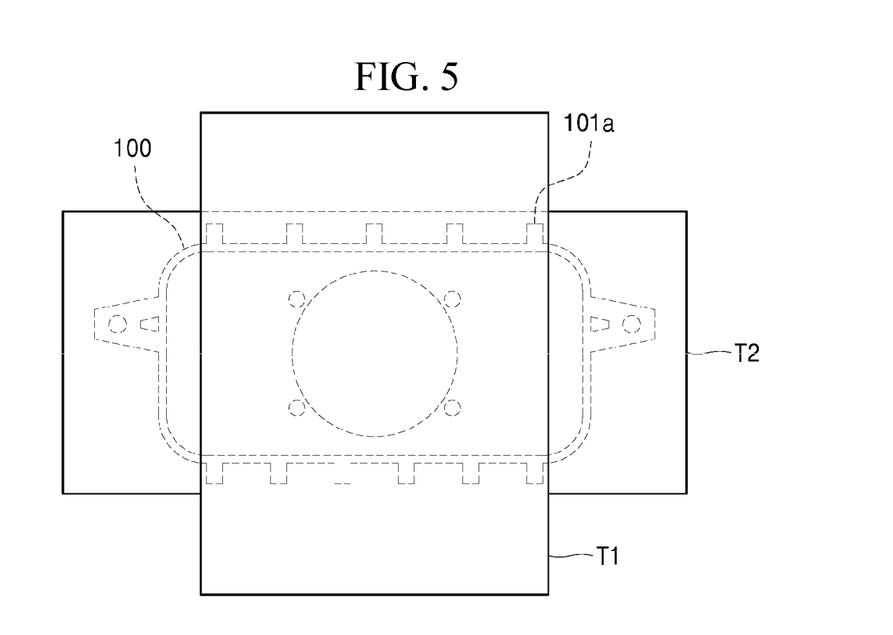
FIG. 5 shows first and second fiber reinforced composite materials which are cross-plied in order to manufacture the housing of a passenger air bag according to the first embodiment of the present invention and shows a hook type configuration.

Meanwhile, the embodiment shown in FIG. 5 illustrates a hook type configuration and the reference symbol 101a to be explained refers to a hook coupling portion. It is possible to couple the configuration with a counterpart by using the hook coupling portion.

Figure 6:
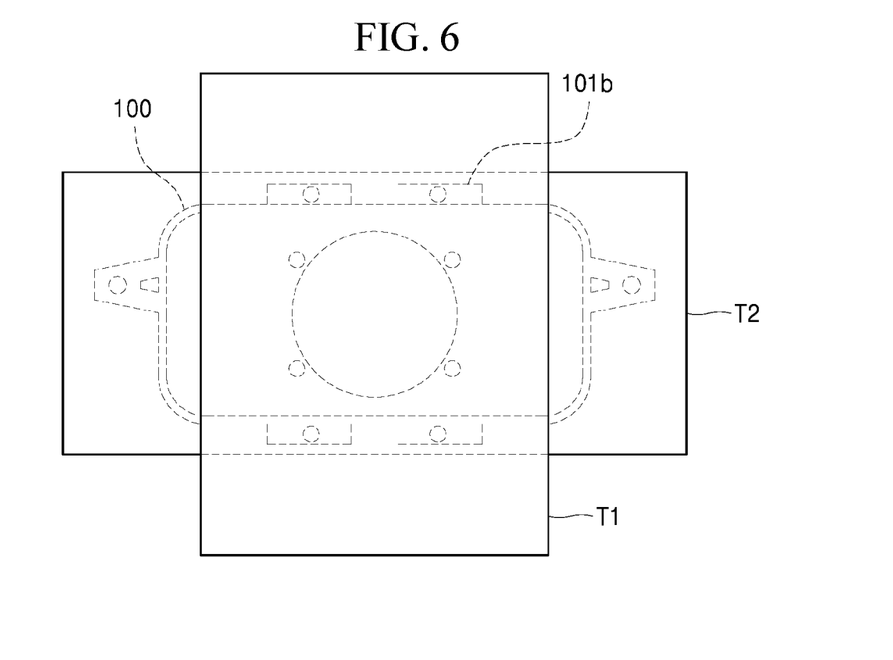
FIG. 6 shows a bolt type configuration which is different from the shape shown in FIG. 5.

Different from above, the embodiment shown in FIG. 6 is different from the hook type shown in FIG. 5 and the embodiment here can be coupled with the counterpart using a bolt. The reference symbol 101b to be explained refers to bolt coupling portion having a bolt hole. However, the shapes of the configurations do not have to comply with the shapes shown, and they are not restricted to the shown shapes.

Figure 3:
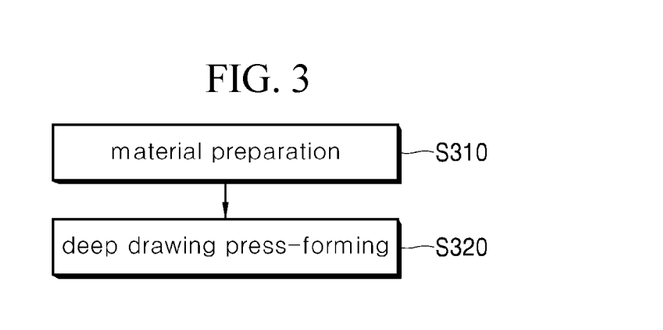

FIG. 3 is a flow chart which simply illustrates methods of manufacturing a housing of a passenger air bag according to the second embodiment of the invention.

When referring to FIG. 3, the method of manufacturing a housing of a passenger air bag of a passenger air bag according to the second embodiment of the present invention includes a material preparation step S310, and a press-forming step S320.

According to the second embodiment of the present invention, in the material preparation step S310, a single fabric-like fiber reinforced composite material T (refer to FIG. 8) is prepared.

In the meantime, one of a continuous fiber reinforced thermoplastic (CFT), a long fiber reinforced thermoplastic (LFT), and short fiber reinforced thermoplastic (SFT) is preferably used as the single fiber reinforced composite material T (refer to FIG. 8); however the fiber reinforced composite material is not restricted to these.

And, the single fiber reinforced composite materials T (refer to FIG. 8) can include a reinforcing fiber and a thermoplastic resin.

Although at least one selected from a group consisting of a glass fiber, an aramid fiber, a natural fiber, a polyester fiber, a polyamide fiber and a combination thereof can be preferably used as the reinforcing fiber, the reinforcing fiber is not restricted to these.

Although the at least one selected from a group consisting of a polypropylene resin, a polyethylene resin, a polyamide resin, a polyester resin, a polyphenylene sulfide resin, and a combination thereof can be preferably used as the thermoplastic resin, the thermoplastic resin is not restricted to these.

More specifically, as shown in FIG. 8, it is preferred that the single fiber reinforced composite material T is provided to have a larger area than that of a plan figure of the housing 200 of an air bag. It is for readily manufacturing the housing with a target shape from a fabric-like single material by using a deep drawing pressing forming.

In the press-forming step S320, the single fiber reinforced composite material T (refer to FIG. 8) is deep drawing press-formed to form the housing 200 of an air bag (refer to FIG. 8).

In order to deep drawing press-form the single fiber reinforced composite material T (refer to FIG. 8), the press mold 10 shown in FIG. 10 can be used. That is, the fabric-like fiber reinforced composite material T (refer to FIG. 8) having a larger area than a plan figure of the housing 200 of an air bag is inserted between the upper and lower molds 11, 13 (refer to FIG. 10), and the result can be press-formed to form a target housing shape of an air bag. As a result, the housing 100 of a passenger air bag as shown in FIG. 6 can be manufactured.

Figure 7:
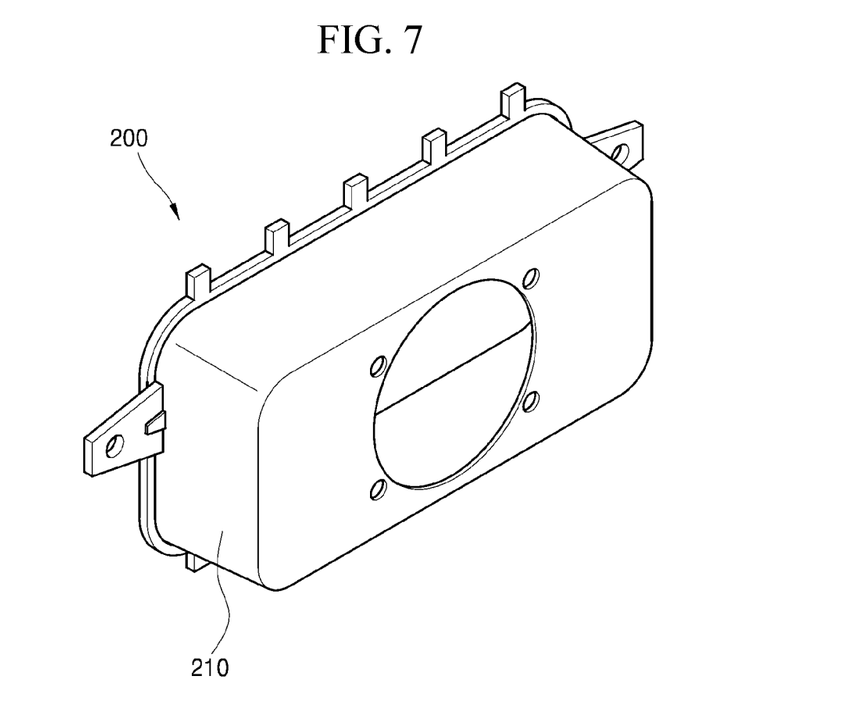
FIG. 7 is a perspective view which schematically shows the housing of a passenger air bag according to a second embodiment of the present invention.

When referring to FIG. 7, the shown housing 200 of a passenger air bag is manufactured by deep drawing press-forming a single fiber reinforced composite material T (refer to FIG. 8). That is, the housing 200 of a passenger air bag 200 has a cross-section configuration which is made of a single fiber reinforced composite material T (refer to FIG. 8) only, and required structural strength and hardness can be guaranteed by properly adjusting a thickness of the housing.

Meanwhile, the embodiment shown in FIG. 8 illustrates a hook type configuration and the reference symbol 201a to be explained refers to a hook coupling portion. It is possible to couple the configuration with a counterpart by using the hook coupling portion.

Figure 9:
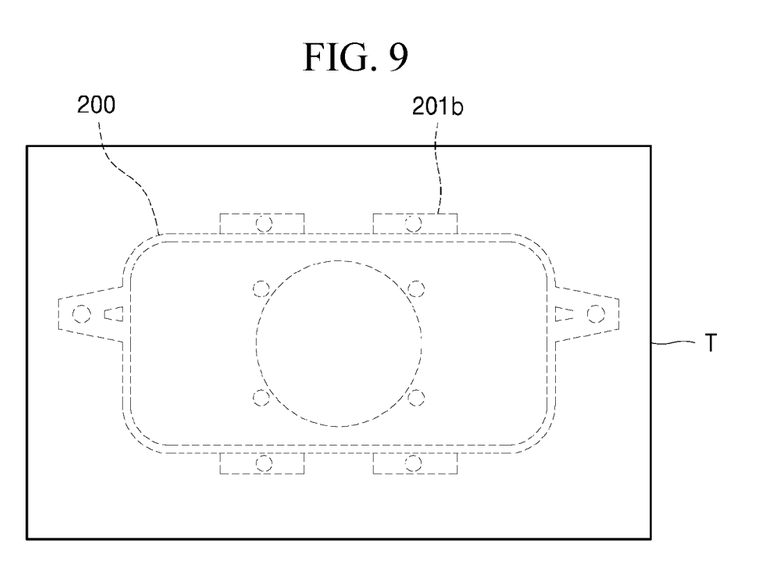
FIG. 9 shows a bolt type configuration which is different from the shape shown in FIG. 8.

Different from above, the embodiment shown in FIG. 9 is different from the hook type shown in FIG. 8 and the embodiment here can be coupled with the counterpart using a bolt. The reference symbol 201b to be explained refers to bolt coupling portion e. However, this embodiment is only an exemplary shape and the housing does not have to comply with this shape. The housing can also be used in other shapes.

As explained in the above, according to the configuration and function of the present invention, it is possible to guarantee structural strength and hardness required for a housing of a passenger air bag of a vehicle.

Also, when compared to the conventional steel material, the housing made of the fiber reinforced composite material is not corroded even after a long time use, which results in improvement in satisfaction during use, and increases endurance of the product.

In addition, when compared to the conventional steel material, it is possible to manufacture the housing of a passenger air bag of a vehicle by press-forming at least one fiber reinforced composite material. Therefore, weight of components of the vehicle is reduced.

Furthermore, the manufacturing process for a housing of a passenger air bag is simplified when compared to the conventional case, which results in improvements in productivity and cost competitiveness.

Although the present invention has been explained by referring to the appended figures as in the above, it is to be noted than the present invention is not restricted to the embodiments and figures disclosed with this specification, and that various modifications can be made by the person having ordinary skill in the art within the scope of the technical spirit of the present invention. And, it is apparent that, although the effects according to the configuration of the present invention are not clearly written and described while explaining the embodiments of the present invention, any effect, which can be predicted by the corresponding configuration, can also be anticipated.

The invention claimed is:
1. A method of manufacturing a housing of a passenger air bag comprising:
a material preparation step of preparing first and second fiber reinforced composite materials; and a press-forming step of cross-plying and then press-forming the first and second fiber reinforced composite materials to form the housing of a passenger air bag, wherein, in the material preparation step, the first and second fiber reinforced composite materials include a reinforcing fiber and a thermoplastic resin, and the first and second fiber reinforced composite materials are prepared using at least one of the group consisting of a continuous fiber reinforced thermoplastic (CFT), a long fiber reinforced thermoplastic (LFT), and a short fiber reinforced thermoplastic (SFT), wherein the first and second fiber reinforced composite materials are in a sheet shape, wherein, in the press-forming step, the first and second fiber reinforced composite materials are heated to a predetermined temperature and placed between upper and lower molds of a press mold, and the upper and lower molds are pressed against each other, thereby forming the housing of a target shape from the first and second fiber reinforced composite materials, wherein cross-plying the first and second fiber reinforced composite materials comprises arranging one of the first or second fiber reinforced composite materials in a length direction of the housing, and arranging the other of the first or second fiber reinforced composite materials in a width direction of the housing, and wherein the first and second fiber reinforced composite materials are stacked on top of the other to be overlapped at a central region except for both ends of the length direction of the housing, and an overlap ratio is adjusted.

2. The method of manufacturing a housing of a passenger air bag of claim 1, wherein, in the material preparation step, the reinforcing fiber comprises at least one reinforcing fiber selected from a group consisting of a glass fiber, an aramid fiber, a natural fiber, a polyester fiber, a polyamide fiber and a combination thereof.

3. The method of manufacturing a housing of a passenger air bag of claim 1, wherein, in the material preparation step, the thermoplastic resin comprises at least one thermoplastic resin selected from a group consisting of a polypropylene resin, a polyethylene resin, a polyamide resin, a polyester resin, a polyphenylene sulfide resin, and a combination thereof.

\* \* \* \* \*